United States Patent [19]

Ueki et al.

[11] Patent Number: 4,924,161
[45] Date of Patent: May 8, 1990

[54] POSITION AND SPEED DETECTING DEVICE

[75] Inventors: Yasuhiro Ueki, Sagamihara; Toru Fujimoto, Yokohama, both of Japan

[73] Assignee: Victor Company of Japan, Ltd., Yokohama, Japan

[21] Appl. No.: 333,679

[22] Filed: Apr. 6, 1989

[30] Foreign Application Priority Data

Apr. 6, 1988 [JP] Japan .................................. 63-84930

[51] Int. Cl.$^5$ ............................................ G05B 19/10
[52] U.S. Cl. .................................... 318/567; 324/166; 324/207.15; 324/173
[58] Field of Search ................. 318/567; 324/208, 166, 324/167, 173

[56] References Cited

U.S. PATENT DOCUMENTS

| | | | |
|---|---|---|---|
| 4,410,853 | 10/1983 | Ikoma | 324/167 |
| 4,529,934 | 7/1985 | Heinrich | 324/173 |
| 4,695,795 | 9/1987 | Nakamizo | 324/208 |
| 4,746,862 | 5/1988 | Ueki | 324/208 |
| 4,818,939 | 4/1989 | Takahashi et al. | 324/208 |

Primary Examiner—William M. Shoop, Jr.
Assistant Examiner—Saul M. Bergmann
Attorney, Agent, or Firm—Fleit, Jacobson, Cohn, Price, Holman & Stern

[57] ABSTRACT

A position and speed detecting device is provided. This device includes a detection-signal generator comprising a rotor magnet assembly having a plurality of magnetic poles and a coil pattern for signal detection which moves relatively facing magnetized bodies of the rotor magnet assembly, a speed-signal detector for taking out a signal for frequency detection from said coil pattern for frequency-signal detection to produce a signal for speed detection; and a position-signal detector for producing a signal for position detection from said coil pattern for position-signal detection. An interface of at least one pair of S and N magnetic poles slanted at an angle different from that of interfaces of other magnetic poles and a part of coil pattern in the coil pattern for signal detection is slanted at an angle substantially the same as that of the magnetic poles for position-signal detection and other part of coil pattern is formed at an angle substantially the same as that of the magnetic poles for frequency-signal detection to make it a coil pattern for frequency-signal detection.

6 Claims, 4 Drawing Sheets

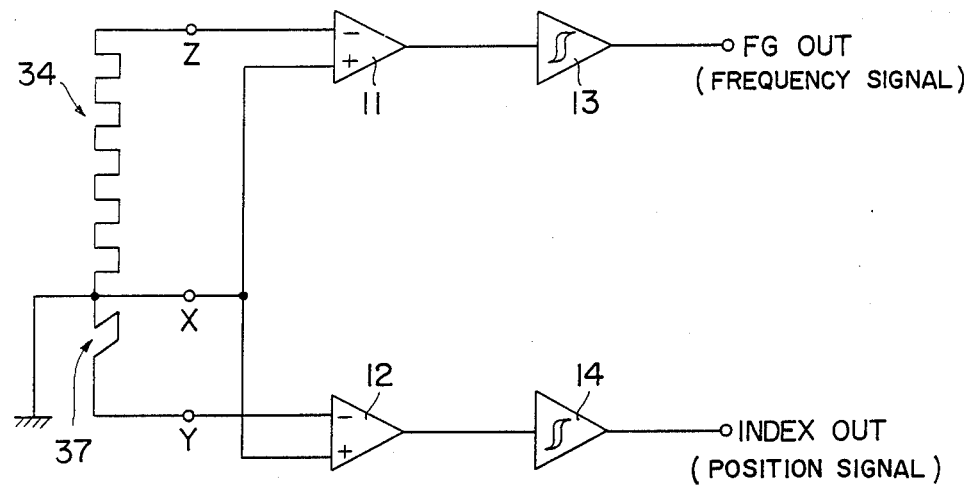
FIG. 1
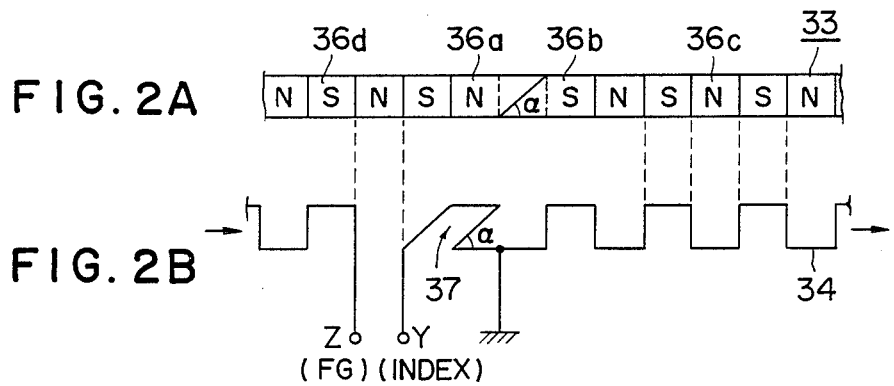
FIG. 2A
FIG. 2B
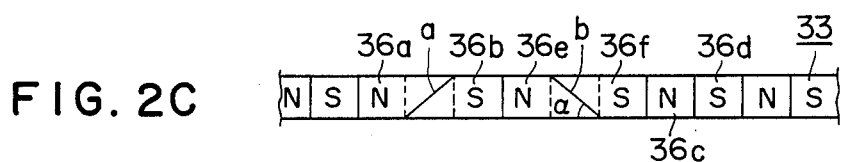
FIG. 2C
FIG. 2D

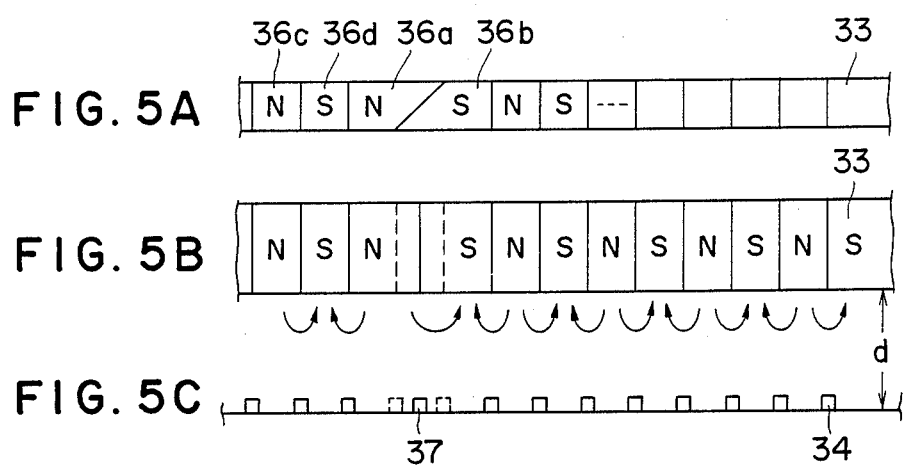
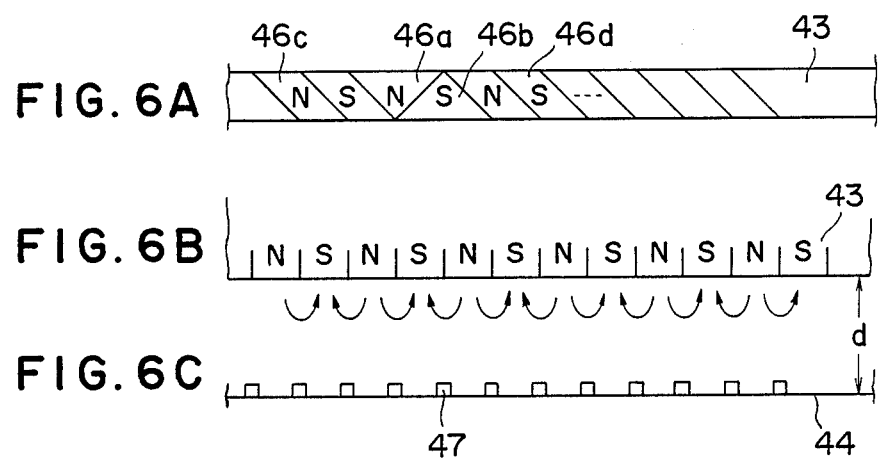

POSITION AND SPEED DETECTING DEVICE

BACKGROUND OF THE INVENTION

This invention relates to a device for detecting a relative position and a relative moving speed between two bodies which rotate and move relatively, and more particularly, to a position and speed detecting device of a rotating body which is most suitable for obtaining control signals for phase servo or speed servo in a rotating driving device, such as a rotating magnetic head in a VTR (Video Tape Recorder) or the like, speed control of a disk motor of a magnetic disk apparatus, or obtaining position signals, such as index signals on a disk or the like.

In general, in a rotating driving device, such as a rotating-type magnetic head device or the like, a phase detector and a speed detector (a speed control circuit) for detecting the rotation phase and rotation speed of a rotating body is disposed in order to rotate the rotating body, such as a magnetic head drum and the like, at a constant speed in a predetermined rotation phase, and phase servo and speed servo are performed for a driving motor utilizing each detected output. In a brushless motor used as the driving motor, it is necessary to sequentially excite its stator coil according to a predetermined drive sequence in accordance with a rotation angle position of rotor magnet. Hence, a position detection circuit for detecting the rotation angle position of the rotor magnet is disposed in the brushless motor. In the following description, a combination of an FG (Frequency Generator) coil pattern and a rotor magnet may be described as a "detection-signal generator".

The various configurations of such a conventional position and speed detecting device are disclosed in Japanese Laid-open Jikkaisho 187406/1986, 193318/1986, 193319/1986 and Tokkaisho 117460/1983.

According to them, one of conventional position and speed detecting devices uses a circular FG coil pattern of serially connected multiple coil sections of which a pitch of the coil section is partly modified to have a finer pitch in contrast to other part of the circular FG coil pattern, i.e. in such a coil pattern, each of the $2^n$th ($n=0, 1, 2, 3 \ldots$) coil sections of the multiple coil sections has a narrow pitch which is smaller than a half of the pitch of other coil sections. And a rotor magnet pattern of alternated magnetic polarity sections associated with the circular FG coil pattern is correspondingly subdivided to be smaller than a half of the pitch of other magnetic polarity sections at the $2^n$th positions correspondingly with the $2^n$th coil section.

It is possible to provide the FG coil pattern and rotor magnet formed in ½ pitch at only one location. Such a configuration can be realized as a combination of disks facing each other, or as a plane and a cylindrical surface.

A signal which is taken out from the coil pattern and which has a higher threshold value between two pulse circuits is taken out as a standard position signal, and a signal from another pulse circuit which has a lower threshold value is taken as a rotation-speed detecting signal, respectively.

In a conventional position and speed detecting device as described above, it is necessary to make the relationship between an equidistant pitch $P_1$ and a pitch $P_2$ a width of 2:1 at a predetermined position, with the distribution of magnetic flux varies in accordance with the amount of pitch, and therefore there is a disadvantage that the output level of an electromotive force e which is generated by a magnetic pitch for a gap d and which is determined by $B \cdot l \cdot v = e$ (B: effective magnetic flux density which the FG coil receives, l: FG coil length interlinking the moving direction of the magnetic pole. v: relative moving speed) is small. Particularly, in a conventional device which has a detection-signal generating unit having a narrow pitch at $2^n$-th positions, the width of a narrow pitch is still smaller than ½ when compared with the equidistant pitch of the rotor magnet. Hence, there is a disadvantage that the output level of an electromotive force generated by a magnetized pitch for a gap d becomes still smaller.

BRIEF DESCRIPTION OF THE DRAWINGS

In the accompanying drawings:

FIG. 1 is a circuit diagram of an embodiment of a position and speed detecting device according to the present invention;

FIGS. 2A-2D illustrate first and second embodiments of a detection signal generator according to the present invention;

FIGS. 5A-5C illustrate the principle of operation of the first embodiment; and

FIGS. 6A-6C illustrate the principle of operation of the third embodiment.

SUMMARY OF THE INVENTION

Figure 3A:
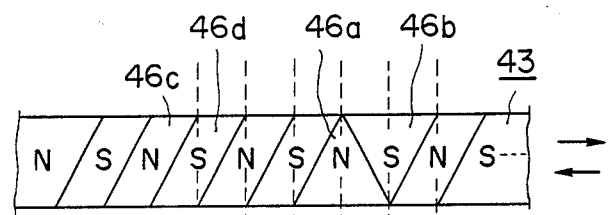
FIGS. 3A-3D illustrate third embodiment of a detection signal generator according to the present invention.

It is an object of the present invention to increase the output level of an electromotive force which is determined by a magnetized pitch of a rotor magnet for a gap between an FG coil pattern and the rotor magnet, and to obtain various kinds of servo signals with a high accuracy.

According to the present invention, there is provided a position and speed detecting device comprising: a detection-signal generating means comprising a rotor magnet assembly having a plurality of magnetic poles and a coil pattern for signal detection which moves relatively facing magnetized bodies of the rotor magnet assembly, an interface of at least one pair of S and N magnetic poles among the magnetic poles being slanted at an angle different from that of interfaces of other magnetic poles to make the pair of magnetic poles magnetic poles for position-signal detection and to make other magnetic poles magnetic poles for frequency-signal detection, and a part of coil pattern in the coil pattern for signal detection being slanted at an angle substantially the same as that of the magnetic poles for position-signal detection to make it a coil pattern for position-signal detection, and other part of coil pattern being formed at an angle substantially the same as that of the magnetic poles for frequency-signal detection to make it a coil pattern for frequency-signal detection; speed-signal detection means for taking ot a signal for frequency detection from the coil pattern for frequency-signal detection to produce a signal for speed detection; and position-signal detection means for producing a signal for position detection from the coil pattern for position-signal detection.

According to the present invention, the disadvantage in a conventional position and speed detecting device that the output level of an electromotive force which is generated by a magnetized pitch of a rotor magnet for a gap between an FG coil pattern and a rotor magnet and which is determined by B·l·v is small, is removed, and it is possible to obtain a position signal having a sufficiently high output level with a simple configuration. Accordingly, the present invention has the excellent feature in that when a position and speed detecting device of the present invention is used for a rotating driving device, such as a rotating magnetic head of a VTR, it is possible to obtain control signals for phase servo and speed servo with a high accuracy, and when used for a magnetic disk apparatus, it is possible to easily perform speed control of a disk motor and to easily obtain position signals such as index signals on a disk or the like.

DESCRIPTION OF THE PREFERRED EMBODIMENTS

FIG. 1 is a circuit diagram of an embodiment of a position and speed detecting device 10 according to the present invention. However, the illustration of a rotor magnet for generating FG signals is omitted. FIGS. 2A–2D and 3A–3D are diagrams showing the principle of this invention for the first through third embodiments of a detection-signal generator which is a main unit of the device 10 of the present invention. In these figures, magnets and coils seen from identical directions are illustrated disposed at the upper and lower positions, respectively, for the sake of convenience. It is to be noted that they are not necessarily plan views or developments. That is, a detection-signal generator may have the shape of a disk or a cylinder, or another rotating body, and is not limited to a specific shape.

The position and speed detecting device 10 of the present invention comprises, as shown in FIG. 1, a coil (a pattern) 34 for FG-signal detection, a coil 37 for PG-signal detection, an amplifier 11 for FG-signal amplification, an amplifier 12 for PG(Pulse Generator)-signal amplification, a Schmitt 13 for FG signal, a Schmitt circuit 14 for index-pulse (position-signal) generation and a rotor magnet at the side surface (or the circumferential surface) of which FG magnetic poles 36c and 36d and PG magnetic poles 36a and 36b facing the coils 34 and 37 for FG- and PG-signal detections, respectively, are formed as shown in FIGS. 2 and 3. The amplifiers 11 and 12 are constituted by inverting amplifiers. The Schmitt circuits 13 and 14 comprise comparators having predetrmined threshold levels.

The important feature of the device of the present invention is that, as is more apparent from FIGS. 2 and 3, a coil pattern for FG (speed)-signal generation is provided at an equal interval as in the prior art, and a coil pattern for PG-signal generation is provided at a rather wider pitch interval and is also skewed to have an angle $\alpha$, while it is formed as narrow as no larger than a half in the prior art. Each embodiment of the detection-signal generating unit will be hereinafter described together with reference to diagrams of signal waveforms for explaining operation in FIG. 4.

Figure 4A:
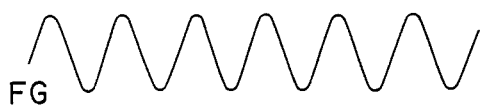
FIGS. 4A-4F illustrate waveforms which are obtained by the second embodiment.
Figure 4B:

In a first embodiment, as shown in FIG. 2A, a pair of magnetic poles (PG magnetic poles) 36a and 36b for PG-signal generation are formed using a space covering three magnetic poles for magnetic poles (FG magnetic poles) 36c and 36d of a rotor magnet 33 for FG-signal generation. The PG magnetic poles 36a and 36b obliquely (angle $\alpha$) cross with each other using a space of one center magnetic pole as shown in FIG. 2A. On the other hand, the coil pattern 37 for PG-signal detection which is formed in a part of the FG coil pattern 34 is formed skewed at the same angle $\alpha$ by one pitch as illustrated in FIG. 2B. Accordingly, a signal FG for speed detection having a constant frequency as shown in FIG. 4A is taken out from an output terminal Z, and a signal PG for position (index) detection is taken output one per each rotation as shown in FIG. 4B, from an output terminal Y.

Figure 4C:
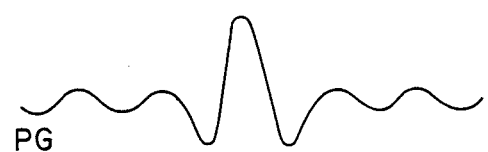

Next, in a second embodiment illustrated in FIGS. 2C and 2D, as shown in FIG. 2C, two pairs of PG magnetic poles 36a and 36b, and 36e and 36f are formed using a space covering six magnetic poles for FG magnetic poles 36c and 36d. Oblique interfaces a and b between these two pairs of magnetic poles 36a and 36b, and 36e and 36f are slanted in symmetrical directions to each other as illustrated in FIG. 2C. Coil patterns 37a and 37b for PG-signal detection formed in a part of the FG coil pattern 34 are formed slanted in the directions identical (identical angles $\alpha$) to those of the oblique interfaces a and b, respectively, as shown in FIG. 2D. Consequently, a signal FG for speed detection from the output terminal Z has a waveform which is nearly identical as that shown in FIG. 4A, while a signal PG for position detection from the output terminal Y has an output which is nearly twice that in the first embodiment shown in FIG. 4B, as shown in FIG. 4C.

Figure 3B:
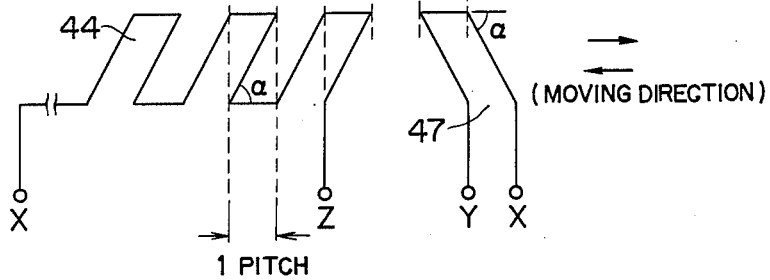
Figure 3C:
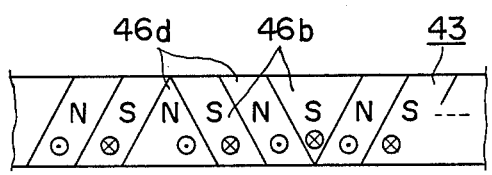
Figure 3D:
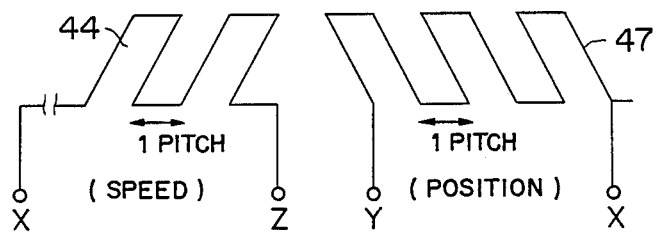
Figure 4D:
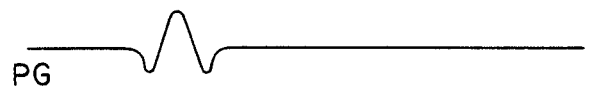

Next, a third embodiment of the detection-signal generating unit used in the device of the present invention will be explained with reference to FIGS. 3A through 3D. In the third embodiment, not only a pair of PG magnetic poles 46a and 46b (formed at one point for one rotation) but also FG magnetic poles 46c and 46d are skewed, as shown in FIG. 3A. However, the FG magnetic poles 46c and 46d are skewed in a direction opposite (angle: $\alpha$) to that of the magnetic poles 46a and 46b. An FG coil pattern 44 and a coil pattern 47 for PG-signal detection are also slanted at the same angles as the magnetic poles 46c and 46d for FG-signal generation and the PG magnetic poles 46a and 46b, respectively, as shown in FIG. 3B. Although, in FIG. 3B, the magnetic poles 46a–46d and coil patterns 44 and 47 are slanted so that each of them is shifted by one pitch at both ends in the direction of the width, the slanting is not limited to this approach, but they may be slanted so that each of them is shifted by n (n is an integer) pitches. Due to the configuration in which the two detectors are slanted in opposite directions to each other, there is no mutual interference of signals. A signal FG speed detection having a constant frequency as shown in FIG. 4A is taken out between output terminal X and Z, and a signal PG for position (index) detection per each rotation as shown in FIG. 4D is taken out between output terminals X and Y.

Figure 4E:

The magnetization for FG (the magnetic poles 46c and 46d) and the slant of the coil pattern 44, and the magnetization for index (the magnetic poles 46a and 46b) and the absolute value of slant angles of the coil patterns 44 and 47 are not necessarily identical or symmetrical. The slant angle of the magnetic poles 46c and 46d and the coil pattern 44 may be $\alpha = 90°$ (a right angle). However, in that case, the output of the signal PG for position detection is influenced by the speed signal (becomes a noise component) as shown in FIG. 4E, two pairs of (three oblique interfaces between S and N poles) PG magnetic poles 46a and 46b may be formed as shown in FIG. 3C, and the coil pattern 47 for PG-signal detection may also be formed in triple as shown in FIG.

Figure 4F:

3D. In this case, a signal PG for position detection between the output terminals X and Y becomes an excellent signal which is not influenced by the speed signal as shown in FIG. 4F.

Now, the principles of operation and the like of each embodiment of the detection-signal generating unit described above will be explained with reference to FIGS. 5A through 5C and FIGS. 6A through 6C. FIGS. 5A through 5C, and FIGS. 6A through 6C are diagrams showing the principle of the distributions of magnetic fluxes generated at the detection signal generating units in the first and third embodiments FIG. 2 and FIGS. 3A and 3B), respectively. In each figure, A and B are a plan view and a side view of the rotor magnets 33 and 43, respectively, and C is a side view of coil patterns 34 (and 37) and 44 (and 47), respectively. As is apparent from these figures, since the surface areas of the PG magnetic poles 36a, 36b, 46a and 46b of the rotor magnets 34 and 43 are not smaller (rather larger) than the surface areas of the FG magnetic poles 36c, 36d, 46c and 46d, the output levels from the PG magnetic poles 36a, 36b, 46a and 46b which are determined as Blv by the magnetizing pitch for the gap d are sufficiently large. Consequently, the disadvantages in the prior art disappear.

What is claimed is:

1. A position and speed detecting device comprising:

a detection-signal generating means comprising a rotor magnet assembly having a plurality of magnetic poles and a coil pattern for signal detection which moves relatively facing magnetized bodies of said rotor magnet assembly, an interface of at least one pair of S and N magnetic poles among said magnetic poles being slanted at an angle different from that of interfaces of other magnetic poles to make the pair of magnetic poles magnetic poles for position-signal detection and to make other magnetic poles magnetic poles magnetic poles for frequency-signal detection, and a part of coil pattern in said coil pattern for signal detection being slanted at an angle subtantially the same as that of said magnetic poles for position-signal detection to make it a coil pattern for position-signal detection, and other part of coil pattern being formed at an angle substantially the same as that of said magnetic poles for frequency-signal detection to make it a coil pattern for frequency-signal detection;

speed-signal detection means for taking out a signal for frequency detection from said coil pattern for frequency-signal detection to produce a signal for speed detection; and position-signal detector for producing a signal for position detection from said coil pattern for position-signal detection.

2. A position and speed detecting device according to claim 1, wherein said magnet assembly has one pair of S and N magnetic poles for position-signal detection being formed within a space of at least two magnet poles and the interface line of them is formed at the center of said pair of S and N magnetic poles.

3. A position and speed detecting device according to claim 2, wherein said coil pattern has a slanted part formed within one pitch.

4. A position and speed detecting device according to claim 2, wherein said rotor magnet assembly has two pairs of S and N magnetic poles for position-signal detection each being formed within a space of at least two magnet poles and the interface lines of them are formed at the center of said two pairs of S and N magnetic poles and are slanted in symmetrical directions to each other.

5. A position and speed detecting device according to claim 4, wherein said coil pattern has slanted parts formed corresponding to said symmetrical interface lines.

6. A position and speed detecting device according to claim 2, wherein rotor magnet assembly has a pair of S and N magnetic poles for position-signal detection and a pair of S and N magnetic poles for speed-signal detection, the interface lines of the two pairs being slanted in symmetrical directions to each other.

* * * * *